United States Patent [19]
Harding

[11] Patent Number: 5,285,922
[45] Date of Patent: Feb. 15, 1994

[54] DUAL COMPARTMENT STORAGE TANK

[75] Inventor: Charles W. Harding, Clarkston, Mich.

[73] Assignee: Clawson Tank Company, Clarkston, Mich.

[21] Appl. No.: 38,890

[22] Filed: Mar. 29, 1993

[51] Int. Cl.$^5$ .............................................. B65D 25/00
[52] U.S. Cl. ..................... 220/553; 220/564; 220/565
[58] Field of Search ............... 220/524, 553, 564, 565, 220/4.12

[56] References Cited

U.S. PATENT DOCUMENTS

| | | | |
|---|---|---|---|
| 1,595,633 | 8/1926 | Thwaits | 220/564 |
| 1,808,427 | 6/1931 | McGaffic | 220/564 |
| 2,092,392 | 9/1937 | Hewitt | 220/553 X |
| 2,211,239 | 8/1940 | Liston | 220/564 |
| 3,310,070 | 3/1967 | Black | 220/564 X |

FOREIGN PATENT DOCUMENTS 1088826  9/1960  Fed. Rep. of Germany ...... 220/564

Primary Examiner—Steven M. Pollard
Attorney, Agent, or Firm—Barnes, Kisselle, Raisch, Choate, Whittemore & Hulbert

[57] ABSTRACT

A dual compartment liquid storage tank has a bottom wall, an annular side wall extending upwardly from the bottom wall and a top cover, to define an interior space. A bulkhead extends across the interior space to divide it into two separate compartments completely isolated from one another. The bulkhead is arcuately curved about a vertical axis and is marginally sealed to the bottom and side walls and top cover to prevent transmission of liquid from one compartment to the other. The curved configuration of the bulkhead withstands pressure differentials due to unequally filled compartments without buckling or distortion or failure of the seals, more effectively than a flat bulkhead.

1 Claim, 1 Drawing Sheet

DUAL COMPARTMENT STORAGE TANK

This invention relates generally to storage tanks and refers more particularly to a tank with two separate liquid storage compartments.

BACKGROUND AND SUMMARY OF THE INVENTION

In the past, storage tanks for two different liquids have been constructed with a flat barrier wall or bulkhead to divide the interior of the tank into two separate compartments. This construction is usually satisfactory when the liquid volume in both compartments is the same. However, a problem occurs when the liquid levels are substantially different. For example, after liquid is withdrawn or partially withdrawn from one compartment but not the other, the liquid pressure on the two sides of the flat bulkhead will be unequal and as a result the bulkhead may bulge or become warped or distorted, sometimes causing a failure of the weld between the bulkhead and the tank wall. The problem of unequal pressures also is present when one compartment or the other is tested for leaks by the introduction of air under pressure.

One object of this invention is to provide a dual compartment storage tank which overcomes the problems associated with prior tanks of this type. In accordance with a specific embodiment to be described, the bulkhead is curved in an arc rather than flat and is therefore much more resistant to unequal pressures.

Another object is to provide a dual storage tank which is composed of a relatively few simple parts, is rugged and durable in use, and is easy to manufacture, maintain and assemble.

Other objects, features and advantages of the invention will become more apparent as the following description proceeds, especially when considered with the accompanying drawings.

DETAILED DESCRIPTION

Figure 1:
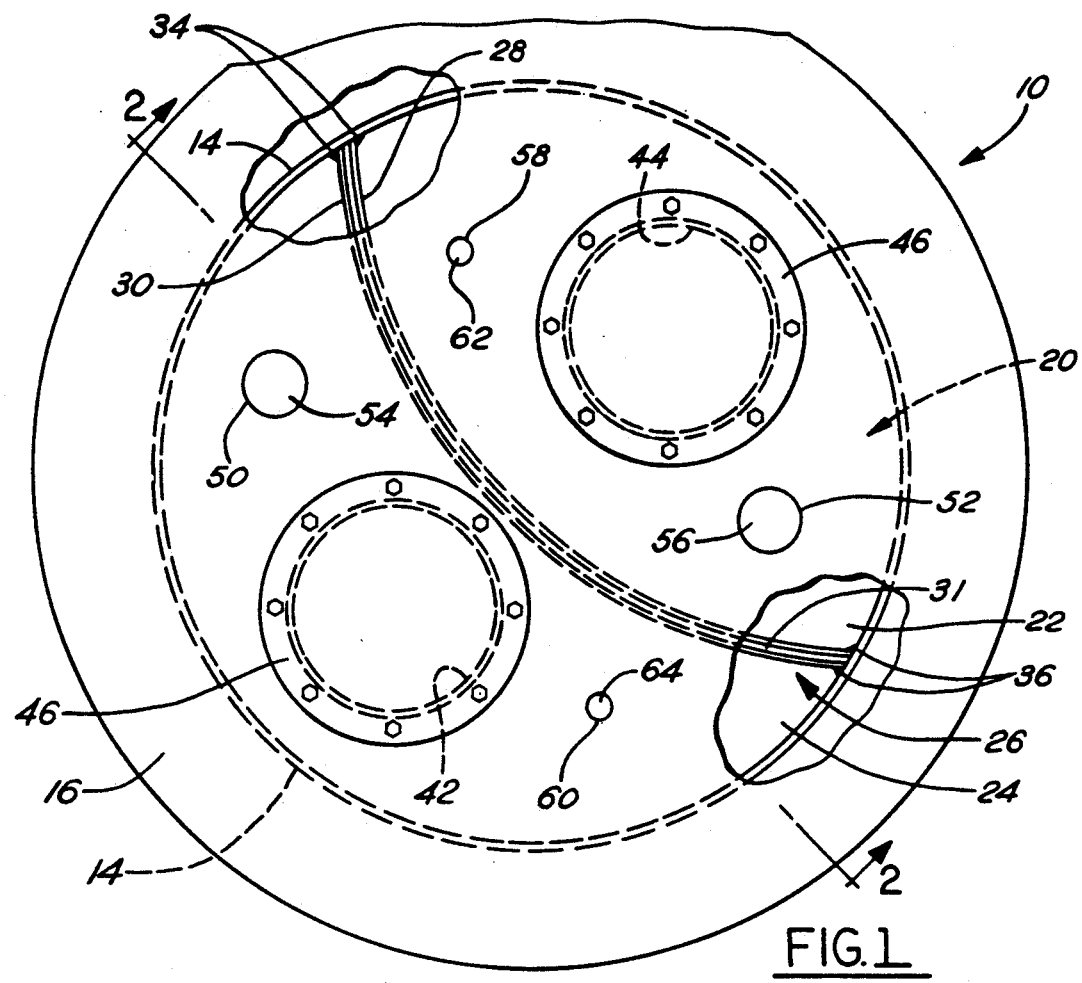
FIG. 1 is a top plan view of a dual storage tank, with parts broken away, constructed in accordance with this invention.

Referring now more particularly to the drawings, the tank 10 has a bottom wall 12 and a side wall 14. Preferably the bottom wall and side wall are formed integrally with each other. The bottom wall is circular and the side wall is cylindrical and extends vertically upwardly from the outer edge of the bottom wall.

A top cover 16 extends over the top of the tank and is sealed to the side wall as by a continuous weld along the full extent of the upper edge of the side wall.

The bottom wall, side wall and top cover define a completely closed and sealed interior space 20 which is divided into two separate liquid compartments 22 and 24 by a bulkhead 26. The two liquid compartments usually hold different liquids, such as gasoline and diesel fuel. The bulkhead is disposed in an upright, vertical position within the tank and is arcuately curved about a vertical axis on a radius which is substantially larger than the radius of the side wall of the tank.

The bulkhead is made up of two substantially identical plates 28 and 30 which are coextensive and overlie one another in laterally spaced apart relation. The plates may be separated by spacers (not shown), if desired, so that there is a small gap or space 31 of uniform width between the plates. The plates may, for example, be ¼" plates and the space between the plates may be ¼" in width. These dimensions may vary, as desired.

The entire tank, including the bottom wall, side wall, top cover and bulkhead are made of a strong material such as steel.

Figure 2:
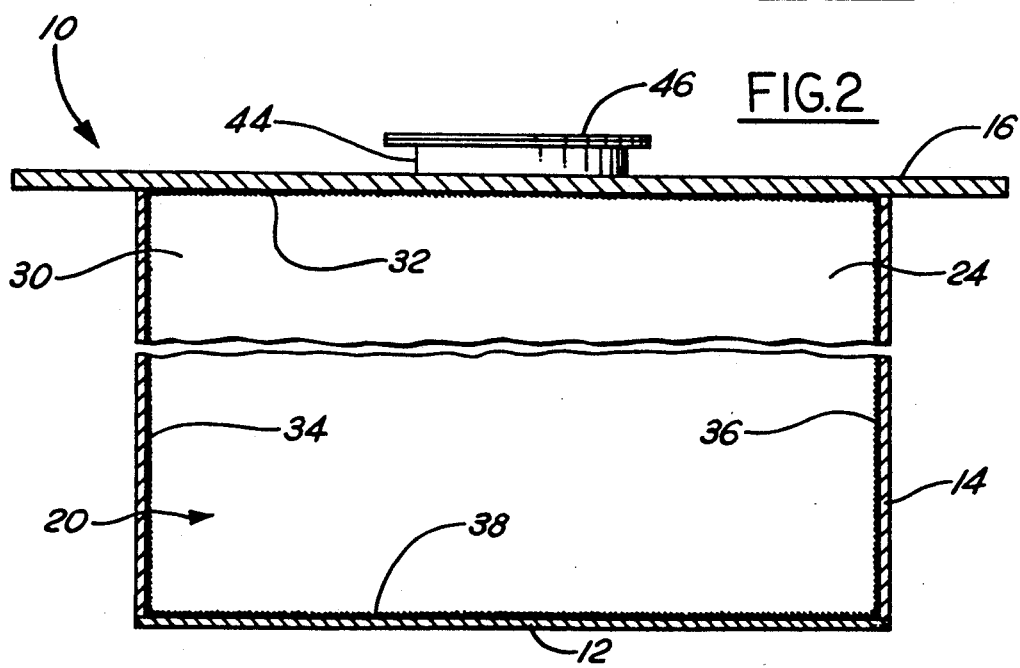
FIG. 2 is a sectional view taken on the line 2—2 in FIG. 1.

The entire peripheries of the plates 28 and 30 are sealed to the interior of the tank so that the two compartments are completely separated and isolated from one another, preventing liquid transfer from one compartment to the other. As seen in FIG. 2, the top edges of the plates of the bulkhead are secured to the top cover as by a weld 32. The opposite side edges of the bulkhead plates are secured to the side wall of the tank as by welds 34 and 36, and the bottom edges of the plates of the bulkhead are secured to the bottom wall of the tank as by a weld 38. These welds are continuous so that, as already stated, the two compartments are completely sealed from one another.

Manholes 42 and 44 in the top cover 16 provide access to the two compartments. These manholes are closed by removable lids 46 and gaskets (not shown) to seal the manhole openings. The manholes permit a workman to enter both compartments in order to properly and completely weld the bulkhead in place and perform other necessary or desirable work on the tank.

Fill openings 50 and 52 in the cover 16 are closed by removable plugs 54 and 56 and are provided for filling the compartments with liquid and for withdrawing liquid therefrom. Vent openings 58 and 60 in the cover have removable caps 62 and 64 for venting the two compartments as may be necessary.

As stated above, it has been found that a curved bulkhead of the construction herein described, rather than a flat bulkhead, is much more resistant to unequal pressures in the tank which may occur when the liquids in the two compartments are at different levels, as when liquid is withdrawn from one compartment but not the other. The curved bulkhead is also more resistant to unequal or differential pressures in the compartments 22 and 24 when one of the compartments is leak tested by the introduction of air under pressure.

The double plate construction of the bulkhead 26 provides added protection against leakage from one compartment to the other. Also, the bulkhead may be tested for leaks by cutting through the top cover 16 and introducing air under pressure into the space between the bulkhead plates. The two liquid compartments 22 and 24 may be leak tested by introducing air under pressure through the fill openings 50, 52 or vents 58, 60.

What is claimed is:

1. A dual compartment storage tank having a bottom wall, an annular side wall extending upwardly from said bottom wall, and a top cover, said bottom all, annular side wall and top cover defining a closed interior space, and a vertical bulkhead extending across said interior space and dividing it into two compartments, said bulkhead comprising a pair of substantially identical vertical arcuate plates which are curved about a common vertical axis throughout their entire lateral extent and are coextensive and overlie one another in closely laterally spaced apart relation, the bottom, side and upper edges of said plates being sealed to said bottom wall, side wall and top cover, respectively, along their entire peripheries so that said compartments are completely sealed and isolated from each other.

* * * * *